(12) United States Patent
Ji et al.

(10) Patent No.: US 12,510,748 B2
(45) Date of Patent: Dec. 30, 2025

(54) SCANNING MICROMIRROR (71) Applicants: Ewha University—Industry Collaboration Foundation, Seoul (KR); WithMEMS Co., Ltd., Hwaseong-si (KR)

(72) Inventors: Chang Hyeon Ji, Seoul (KR); John Gu, Hwaseong-si (KR); Hwang-Sub Koo, Hwaseong-si (KR); Jong-Uk Bu, Hwaseong-si (KR)

(73) Assignees: WITHMEMS CO., LTD., Gyeonggi-Do (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 690 days.

(21) Appl. No.: 17/943,403

(22) Filed: Sep. 13, 2022

(65) Prior Publication Data

US 2023/0118492 A1  Apr. 20, 2023

(30) Foreign Application Priority Data

Oct. 15, 2021 (KR) .......................... 10-2021-0137134

(51) Int. Cl.
*G02B 26/08* (2006.01)
(52) U.S. Cl.
CPC ................................ *G02B 26/0833* (2013.01)

(58) Field of Classification Search
CPC ............. G02B 26/0833; G02B 26/105; G02B 26/0816
See application file for complete search history.

(56) References Cited

U.S. PATENT DOCUMENTS

| | | | |
|---|---|---|---|
| 7,567,367 B2 | 7/2009 | Ji | |
| 8,873,128 B2 | 10/2014 | Conrad et al. | |
| 2018/0017783 A1* | 1/2018 | Ji | ........................ G02B 26/0841 |
| 2020/0049976 A1 | 2/2020 | Grasshoff | |

FOREIGN PATENT DOCUMENTS

| | | | | |
|---|---|---|---|---|
| JP | 2012532350 | 12/2012 | ............. | G02B 26/08 |
| KR | 2006-0016638 A | 2/2006 | | |
| KR | 20070024141 | 8/2007 | ............. | G02B 26/08 |
| KR | 100789574 | 12/2007 | ............. | G02B 26/10 |

* cited by examiner

*Primary Examiner* — James C. Jones
(74) *Attorney, Agent, or Firm* — HAYES SOLOWAY P.C.

(57) ABSTRACT

Provided is a scanning micromirror including a reflective surface rotatable with respect to a rotation axis, a rim disposed on the outside of the reflective surface, a spring positioned on the rotation axis and connected to the reflective surface, and a connector connecting the reflective surface and the rim. The rim may include a first sub-rim disposed on one side and a second sub-rim disposed on the other side with respect to the spring.

12 Claims, 6 Drawing Sheets

SCANNING MICROMIRROR

CROSS-REFERENCE TO RELATED APPLICATION

This application claims the benefit of Korean Patent Application No. 10-2021-0137134 filed on Oct. 15, 2021, in the Korean Intellectual Property Office, the entire disclosure of which is incorporated herein by reference for all purposes.

BACKGROUND

1. Field of the Invention

One or more embodiments relate to a scanning micromirror.

2. Description of the Related Art

With the development of optical device technology, technologies are being developed that use light as an input/output terminal for various information and as a medium for information transmission. For example, a barcode scanner and a scanning laser display use a beam from a light source. Recently various devices and systems are developed which utilize beam scanning with high spatial resolution, such as a projection display system or a head mounted display (HMD) and the like.

Such a beam scanning technology requires a scanning mirror having various scanning speeds and scanning scopes (scanning range, angular displacement, and tilting angle) depending on the application. Existing beam scanning devices are configured by adjusting the angle between the reflective surface and the incident light using a galvanometric mirror or a rotating polygon mirror.

For example, Korean Patent Application No. 2006-0016638 discloses an optical scanning device that operates a micromirror, which reflects input light in a predetermined direction, to change the direction of the reflected light.

The above description is information the inventor(s) acquired during the course of conceiving the present disclosure, or already possessed at the time, and is not necessarily art publicly known before the present application was filed.

SUMMARY

One or more embodiments provide a scanning micromirror that may reduce dynamic deformation.

One or more embodiments provide scanning micromirror that may have desired numerical values according to a user's purpose.

One or more embodiments provide a scanning micromirror applicable to light detection and ranging (LIDAR).

According to an aspect, there is provided a scanning micromirror including a reflective surface rotatable with respect to a rotation axis, a rim disposed on the outside of the reflective surface, a spring positioned on the rotation axis and connected to the reflective surface, and a connector connecting the reflective surface and the rim.

The rim may include a first sub-rim on one side and a second sub-rim on the other side with respect to the spring.

The first sub-rim may include a first sub-rim body member surrounding circumference of the reflective surface, and a first sub-rim extension member which is spaced apart in parallel from the spring and which extends.

The second sub-rim may include a second sub-rim body member surrounding the circumference of the reflective surface and a second sub-rim extension member which is spaced apart in parallel from the spring and which extends.

The connector may include a radial direction connection element which extends in a radial direction of the reflective surface and a circumferential direction connection element which extends in a circumferential direction of the reflective surface.

One end of the radial direction connection element may be connected to the reflective surface, the other end of the radial direction connection element may be connected to the circumferential direction connection element, and the circumferential direction connection element may be connected to the rim.

The rim may include a recess in which the circumferential direction connection element is received.

According to another aspect, there is provided a scanning micromirror including a reflective surface rotatable with respect to a rotational axis, a rim disposed on the outside of the reflective surface, a spring positioned on the rotational axis and connected to the reflective surface, and a connector including one or more connection members connecting the reflective surface and the rim.

The connection members may include a radial direction connection element which extends in a radial direction of the reflective surface and a circumferential direction connection element which extends in a circumferential direction of the reflective surface.

One end of the radial direction connection element may be connected to the reflective surface, and the other end may be connected to the circumferential direction connection element.

The circumferential direction connection element may be connected to the rim.

The connector may include at least two connection members each on both sides of the rotation axis.

The connection members may be symmetrical with respect to the rotation axis.

The connection members are symmetrical with respect to a vertical axis, the vertical axis being perpendicular to the rotation axis and passing through a center of the reflective surface.

Circumferential direction connection elements of neighboring connection members may be connected to each other.

The rim may include a recess in which the circumferential direction connection element is received.

The recess may communicate with one side of the rotation axis and communicate with the other side of the rotation axis.

The rim may include a first sub-rim and a second sub-rim disposed on one side and the other side with respect to the spring.

The first sub-rim may include a first sub-rim body member surrounding the circumference of the reflective surface, and a first sub-rim extension member which is spaced apart in parallel from the spring and which extend.

The second sub-rim may include a second sub-rim body member surrounding the circumference of the reflective surface and a second sub-rim extension member which is spaced apart in parallel from the spring and which extends.

The scanning micromirror according to an embodiment may further include a reinforcing material on the lower part of the reflective surface.

Additional aspects of embodiments will be set forth in part in the description which follows and, in part, will be apparent from the description, or may be learned by practice of the disclosure.

According to embodiments, a scanning micromirror according to an embodiment may reduce dynamic deformation.

The scanning micromirror according to an embodiment may have desired values according to a user's purpose.

A scanning micromirror according to an embodiment is applicable to light detection and ranging (LIDAR).

The effects of the scanning micromirror are not limited to the above-mentioned effects, and other unmentioned effects may be clearly understood from the above description by those having ordinary skill in the technical field to which the present disclosure pertains.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, examples will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not to be limiting of the embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like components and a repeated description related thereto will be omitted. In the description of the embodiments, a detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one component from another component, and the nature, the sequences, or the orders of the components are not limited by the terms. When one component is described as being "connected", "coupled", or "attached" to another component, it should be understood that one component can be connected or attached directly to another component, and an intervening component can also be "connected", "coupled", or "attached" to the components.

The component, which has the same common function as the component included in any one embodiment, will be described by using the same name in other embodiments. Unless disclosed to the contrary, the configuration disclosed in any one embodiment may be applied to other embodiments, and the specific description of the repeated configuration will be omitted.

A scanning device may perform scanning by reflecting incident laser light. In particular, the scanning device may modulate (steer) reflected light through a rotary motion. One of the key components of such a scanning device may be a scanning micromirror.

Figure 1:
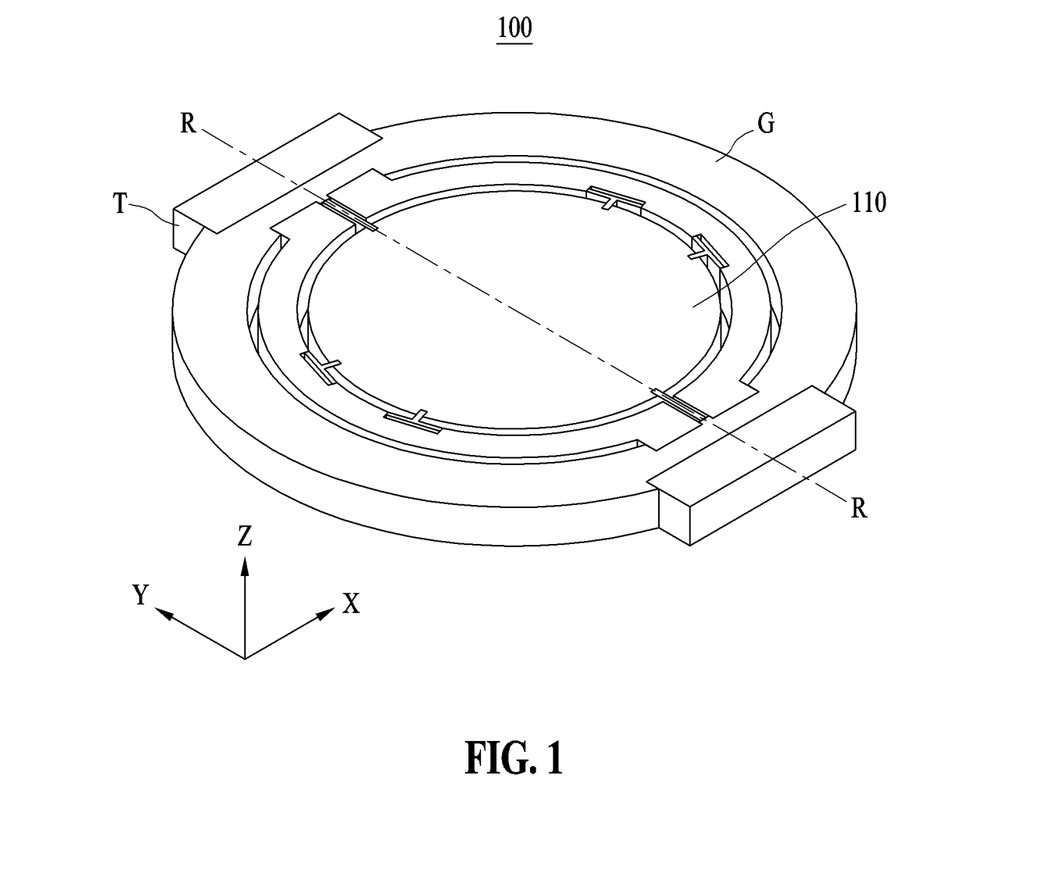
FIG. 1 is a perspective view of a scanning micromirror and a gimbal and a torsion beam according to a first embodiment.
Figure 2:
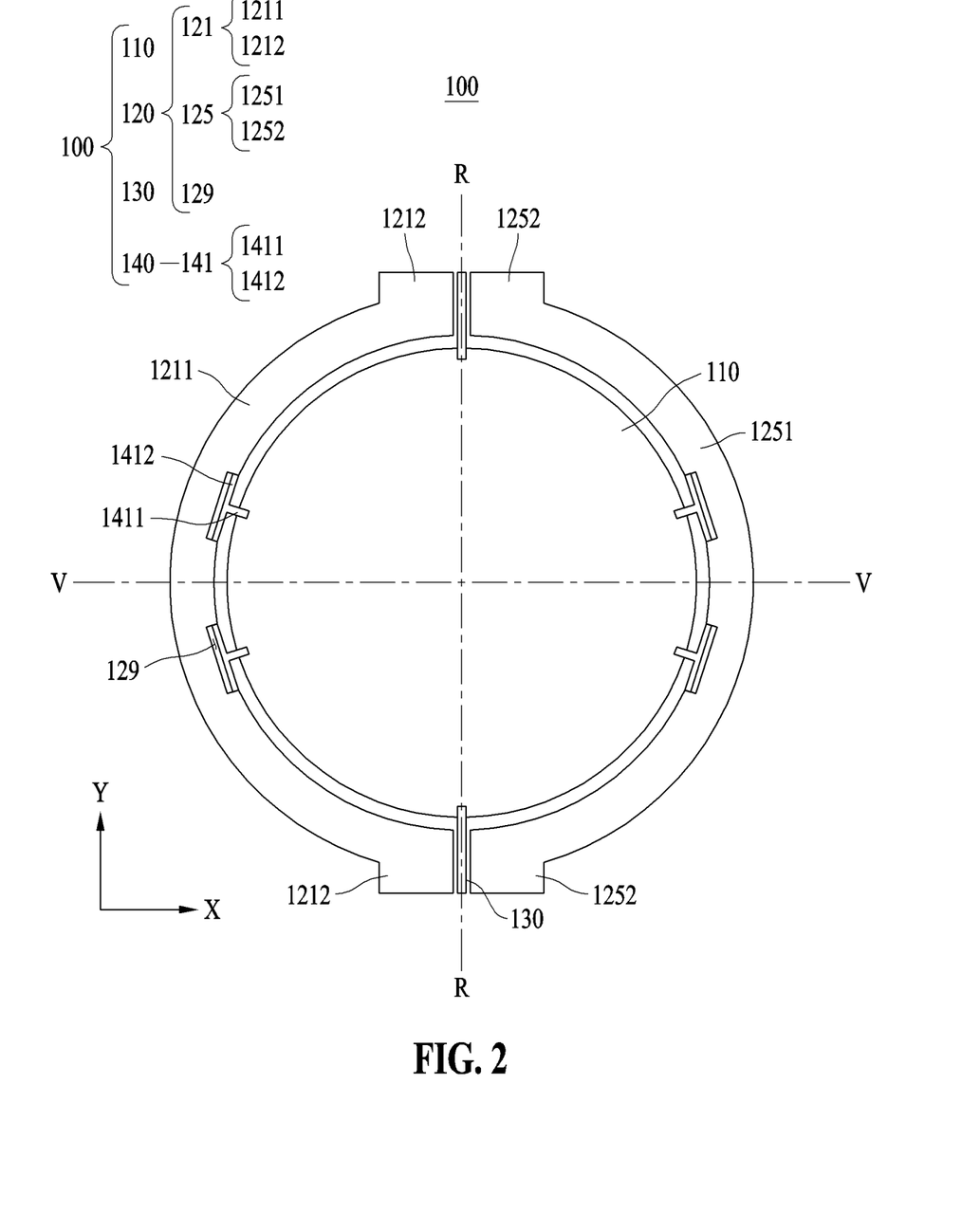
FIG. 2 is a plan view of a scanning micromirror according to a first embodiment.

Referring to FIG. 1, as an example of such a scanning micromirror, a scanning micromirror 100, a gimbal G, and a torsion beam T are illustrated according to a first embodiment, and FIG. 2 illustrates a plan view of a scanning micromirror 100, a gimbal G and a torsion beam T, according to the first embodiment.

Such components may form part of the above-mentioned scanning device. In an actual scanning device, several such scanning micromirrors may be arranged along a specific surface.

With respect to a general scanning device with reference to FIG. 1, when the scanning micromirror 100 according to the first embodiment is taken as an example, the scanning micromirror 100 including a reflective surface 110 may be supported by the gimbal G and the torsion beam T, and the torsion beam T may include a rotation axis R (in parallel to the y-axis) on which the scanning micromirror 100 rotates.

The scanning micromirror may be rotated in one axis and also in two axes. In this case, the scanning device may include a plurality of gimbals and torsion beams. In addition, driving forces for rotating the scanning micromirror 100 may be an electrostatic force, an electromagnetic force, a piezoelectric force, a thermal deformation, or the like.

As the scanning micromirror 100 is a microelectromechanical systems (MEMS) device with a thickness of only several tens of micrometers in general, rotational inertia may cause a bending called dynamic deformation when the scanning micromirror 100 rotates.

When the magnitude of such dynamic deformation is greater than the wavelength ($\lambda$) of the incident light, the incident light may not be accurately reflected, thus decreasing the accuracy of a scanning device. This is a minimum requirement, and a dynamic deformation of less than $\lambda/4$ may be required for more accurate reflection.

In general, the dynamic deformation of the micromirror is expressed by the following equation:

$$\delta_{max} \propto \frac{D^5 f^2 \theta}{t^2}$$

D denotes the reflective surface diameter, f denotes the scan frequency, θ denotes the scan angle, and t denotes the reflective surface thickness.

According to the above equation, the thinner the scanning micromirror, the greater the dynamic deformation, and the larger the diameter of the scanner micromirror, the greater the dynamic deformation.

However, among the above variables, variables in the numerator cannot be changed easily since the variables in the numerator are determined by required specifications of a scanning device. When the thickness of a scanning micromirror increases, the moment of inertia of the scanning micromirror increases and requires greater driving force, which may interrupt the rotation of the scanning micromirror. Therefore, the scope of increasing the thickness of the scanning micromirror is limited.

In addition, a user should be able to freely select a numerical value of a scanning micromirror according to the user's desired service environment. In particular, light detection and ranging (LIDAR) for a car requires a large-diameter reflective surface, which may cause a large dynamic deformation.

Therefore, to overcome such a trade-off, a structure is required that is capable of reducing the dynamic deformation with the thickness of the scanning micromirror not increasing for a given diameter of the scanning micromirror.

Figure 3:
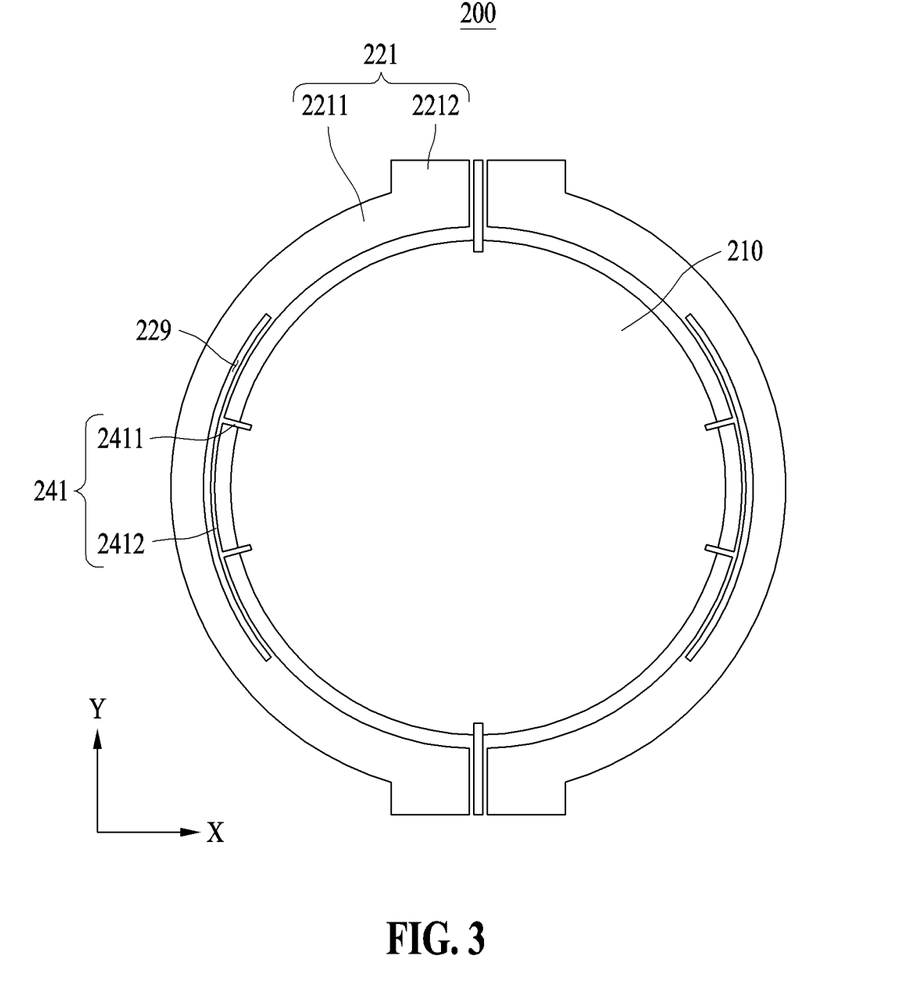
FIG. 3 is a plan view of a scanning micromirror according to a second embodiment.

The scanning micromirror 100 according to the first embodiment and a scanning micromirror 200 according to a second embodiment may have a structure having the following features to achieve the foregoing object. These features are described and illustrated separately in the first embodiment and the second embodiment, but are not limited thereto and may be implemented in an embodiment. Hereinafter, the scanning micromirror 100 excluding the gimbal G and the torsion beam T is described.

FIG. 2 illustrates a plan view of a scanning micromirror 100 according to a first embodiment.

The scanning micromirror 100 according to the first embodiment may include a reflective surface 110 rotatable with respect to a rotation axis, a rim 120 on the outside of the reflective surface 110, and a spring 130 connected to the reflective surface 110, and a connector 140 connecting the reflective surface 110 and the rim 120.

The reflective surface 110 of the scanning micromirror 100 according to the first embodiment may be symmetrical with respect to the rotation axis. The rotation axis may be formed by the spring 130. This is because the spring 130 may be connected to the outside of the reflective surface 110 to become a center axis on which the reflective surface 110 rotates.

The reflective surface 110 of the scanning micromirror 100 according to the first embodiment is a portion that directly reflects light. Dynamic deformation may occur while the reflective surface 110 rotates on the rotation axis, which is the spring 130.

The rim 120 of the scanning micromirror 100 according to the first embodiment may serve as an external reinforcing member on a circumference of the reflective surface 110 to suppress the dynamic deformation of the reflective surface 110. Inertia due to weight of the rim 120 may deform the shape of the rim 120 in a direction opposite to the direction of the dynamic deformation of the reflective surface 110.

That is, when the reflective surface 110 rotates and the left side of the reflective surface 110 is biased downward with respect to the rotation axis, the left side of the rim 120 adjacent to the left side of the reflective surface 110 is biased upward. When the right side of the reflective surface 110 is biased upward, the right side of the rim 120 adjacent to the right side of the reflective surface 110 may be biased downward.

As the thickness of the rim 120 measured in a radial direction of the reflective surface 110 increases, the rim 120 may serve as a stronger reinforcement. Therefore, increasing the thickness of the rim 120 may reduce the dynamic deformation of the reflective surface 110. However, such an increase in the thickness may also raise moment of inertia of the rim 120 around the rotation axis, so there is need to select an appropriate thickness according to required specifications.

In addition, the rim 120 of the scanning micromirror 100 according to the first embodiment may include a first sub-rim 121 and a second sub-rim 125 on one side and the other side around the spring 130.

The first sub-rim 121 may include a first sub-rim body member 1211 surrounding the circumference of the reflective surface 110 and a first sub-rim extension member 1212 which is spaced apart in parallel from the spring 130 and which extends the spring 130. The second sub-rim 125 may include a second sub-rim body member 1251 surrounding the circumference of the reflective surface 110 and a second sub-rim extension member 1252 which is spaced apart in parallel from the spring 130 and which extends.

The spring 130 may extend between the first sub-rim 121 and the second sub-rim 125 and along the first sub-rim extension member 1212 and the second sub-rim extension member 1252. Such an extension of the spring 130 allows the rim 120 to have a longer spring 130 compared to a general circular rim without the extension members of the rim 120.

The extension of the spring 130 reduces overall elastic modulus. This becomes clearer when an equation of the elastic modulus in the series connection of the spring 130 is referred to as shown in the following equation.

$$\frac{1}{k} = \frac{1}{k_1} + \frac{1}{k_2}$$

When the elastic modulus decreases, the spring 130 may accommodate a degree of deformation with less resistance, resulting in decrease in the dynamic deformation.

Meanwhile, lengths of the first sub-rim extension member 1212 and the second sub-rim extension member 1252 may be determined according to a required length of the spring 130 with reference to required specifications.

The connector 140 of the scanning micromirror 100 according to the first embodiment may include one or more connection members 141 connecting the reflective surface 110 to the rim 120.

The connection members 141 may include a radial direction connection element 1411 which extends in a radial direction of the reflective surface 110 and a circumferential direction connection element 1412 which extends in a circumferential direction of the reflective surface 110. One end of the radial direction connection element 1411 may be connected to the reflective surface 110, and the other end may be connected to the circumferential direction connection element 1412. The circumferential direction connection element 1412 may also be connected to the rim 120.

The connection members 141 including the radial direction connection element 1411 and the circumferential direction connection element 1412 may be in a so-called T-shape.

The rim 120 may also include a recess 129 in which the circumferential direction connection element 1412 may be received.

The number and position of the connection member 141 and the recess 129 may vary depending on required specifications. The connection member 141 and the recess 129 may be symmetrical about the rotation axis, and a plurality thereof may be on the left and right sides of the rotation axis.

The scanning micromirror 100 according to the first embodiment, may include two connection members 141 each on the left and right sides of the rotation axis, and the connection members 141 are symmetric with respect to the rotation axis and an axis perpendicular to the rotation axis (in parallel to the x-axis). The number and position of the connection members 141 are not limited to the diagrams and the description included herein.

The combination of the rim 120 including the recess 129 and the connection members 141 in a T-shape may reduce the dynamic deformation of the reflective surface 110 as described above for the following reasons.

This is similar to the reason why a low elastic modulus needs the spring 130 of a long length. Because the low elastic modulus of the connection member 141 may maximize the effect of suppressing the dynamic deformation by the inertia of the rim 120 since the connection members 141 connect the rim 120 to the reflective surface 110, likewise the spring 130 plays a role of connecting the reflective surface 110 and the torsion beam.

However, when the radial length of the connection member 141 is increased to lower the elastic modulus, the radius of the rim 120 is increased and the inertia moment of the rim 120 increases accordingly, so that it is not desirable to increase the radial length of the connection member 141 indefinitely.

Therefore, the connection members 141 are formed in a T-shape, and the recess 129 corresponding thereto is equipped in the rim 120 to produce an effect as if an additional torsion beam was connected to lower the elastic modulus of the connection members 141.

The scanning micromirror 100 according to the first embodiment may further include a reinforcing material (not shown) on the lower part of the reflective surface to reduce dynamic deformation.

The reinforcing material (not shown) may be formed in any suitable shape to prevent the inertia moment with respect to the rotation axis from excessively increasing. For example, the reinforcing material (not shown) may be in the form of a disk having at least one through-portion or may be in the form of a net-shaped mesh having several through-portions.

In addition, in order to increase the effective length as a torsion beam of the connection members 141 above, the circumferential direction connection elements 1412 of the connection members 141 may be further elongated, and correspondingly the recess 129 may further extend horizontally. As the circumferential direction connection element 1412 and the recess 129 grow longer, the effective length as the torsion beam of the connection members 141 may grow longer.

At this time, when the effect of length extension as described above is maximized, the neighboring circumferential direction connection elements 1412 may meet each other, and the neighboring recesses 129 may communicate with each other.

A scanning micromirror 200 according to a second embodiment is illustrated in FIG. 3. as a case in which the effect of the above-described extension is maximized. The components of the scanning micromirror 200 according to the second embodiment are almost the same as or similar to the components of the scanning micromirror 100 according to the first embodiment. Hereinafter, the difference therebetween is mainly described.

The scanning micromirror 200 according to the second embodiment may include a plurality of connection members 241. In addition, second sub-rims 221 of the scanning micromirror 200 according to the second embodiment may include a second sub-rim body member 2211, a second sub-rim extension member 2212, and a plurality of recesses 229.

FIG. 3 illustrates the scanning micromirror 200 having the two connection members 241 each on the left and right sides with respect to a rotation axis R for ease of explanation.

Circumferential direction connection elements 2412 of the adjacent connection members 241 connect each other, as if two radial direction connection elements 2411 connected to the one circumferential direction connection element 2412.

In addition, the adjacent recesses 229 communicate with each other on the left and right sides with respect to the rotation axis R, as if the one recess 229 was on the left and right sides, respectively.

As a result, each of the two connection members 241 on the left and right sides of the rotation axis R may produce the effect as if the two connection members 241 became one separate torsion beam.

Although FIG. 3 illustrates the scanning micromirror 200 including two connection members 241 on the left of the rotation axis R and two connection members 241 on the right side of the rotation axis R, the number of the connection members 241 is not limited thereto, and the scanning micromirror 200 may include three or more connection members 241.

In such a case, similar to the above description, all the circumferential direction connection elements 2412 on the left side of the rotation axis R may be connected and all the recesses 229 on the left side of the rotation axis R may communicate. The same is true of the right side of the rotation axis R.

The scanning micromirror 200 according to the second embodiment may further include a reinforcing material (not shown) to reduce dynamic deformation on the lower part of the reflective surface, similar to the scanning micromirror 100 according to the first embodiment.

Hereinafter, the degree of dynamic deformation between a scanning micromirror C according to a comparative embodiment (see FIG. 4), having only a reflective surface without a rim and connection members and the scanning micromirror 200, according to the second embodiment, is compared to describe the degree of improvement.

Figure 4:
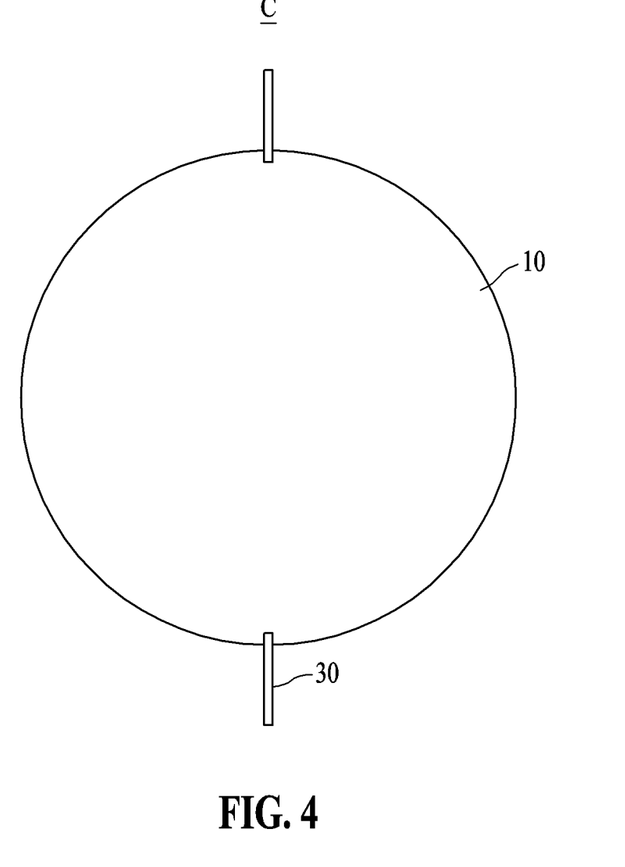
FIG. 4 is a plan view of a scanning micromirror according to a comparative embodiment.

Referring to FIG. 4, a scanning micromirror C according to a comparative embodiment is illustrated. As the scanning micromirror C according to the comparative embodiment has no element to suppress dynamic deformation of the reflective surface around the reflective surface, the dynamic deformation does not decrease.

As the scanning micromirror 200 according to the second embodiment includes a rim capable of suppressing the dynamic deformation of the reflective surface, a sub-rim structure, and T-shaped connection members, which are connected to each other, the dynamic deformation may significantly decrease compared to the scanning micromirror C according to the comparative embodiment.

Figure 5A:
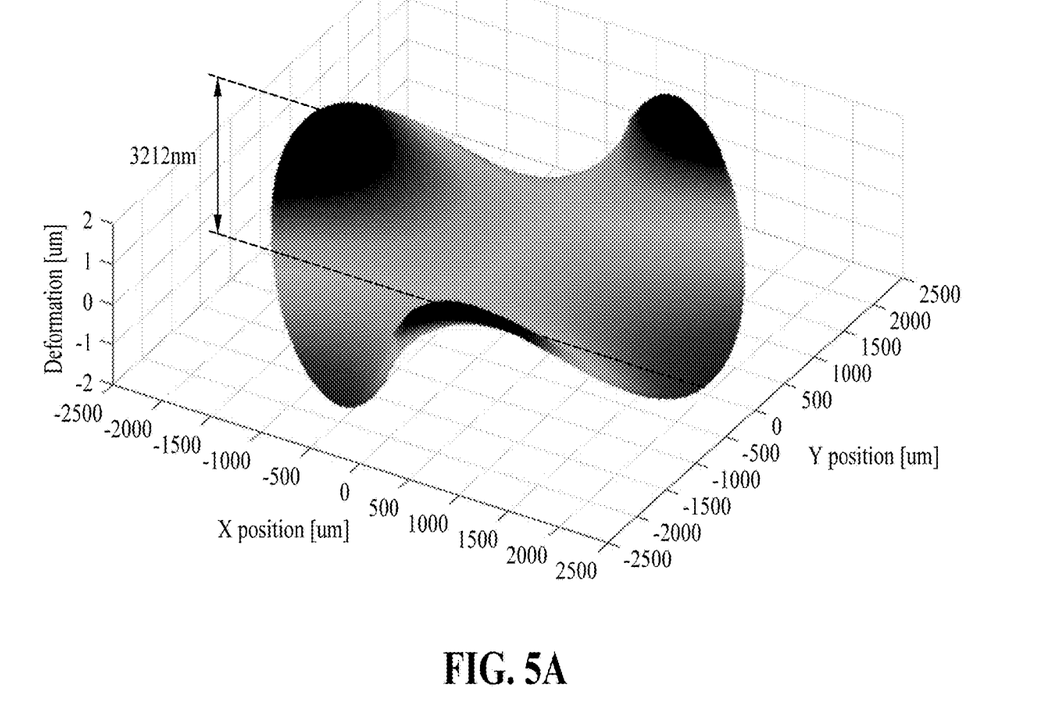
FIG. 5A is a simulation result of dynamic deformation of a scanning micromirror according to a comparative embodiment.
Figure 5B:
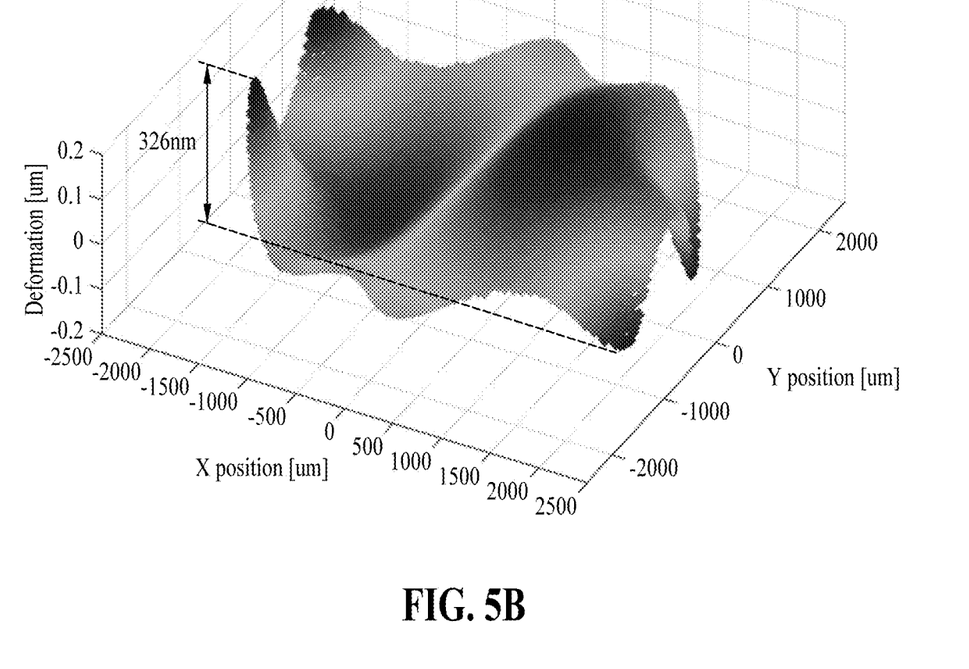
FIG. 5B is a simulation result of dynamic deformation of a scanning micromirror according to a second embodiment.

Specifically, compared are simulation results of dynamic deformation between the rotation of the scanning micromirror C with no element of reducing the dynamic deformation according to the comparative embodiment, and the rotation of the scanning micromirror 200 with the elements of reducing the dynamic deformation, according to the second embodiment.

FIGS. 5A and 5B illustrate the simulation results. FIG. 5A is simulation data showing the degree of dynamic deformation during the rotation of the scanning micromirror C according to the comparative embodiment, and FIG. 5B is simulation data illustrating the degree of dynamic deformation during the rotation of the scanning micromirror 200 according to the second embodiment.

Both the simulation results include a reflective surface with a diameter of 4 mm. In both simulations, the scan frequency is set at 6.25 kHz and the driving angle is set at 30 degrees.

In both results, the rotation axis is the axis extending in y-axis at the x value of "0". Such a rotation axis is the same as the rotation axis of the scanning micromirror 200 according to the second embodiment.

Referring to FIG. 5A, the difference in height in the z-direction between a portion the most biased upward and a portion the most biased downward due to the occurrence of the dynamic deformation is 3212 nm. Also, the root mean square (RMS) value of the dynamic deformation in the entire area of the reflective surface 10 of the scanning micromirror C according to the comparative embodiment is 694 nm.

Referring to FIG. 5B, the difference in height (peak-to-peak value) in the z-direction between the portion most biased upward and the portion most biased downward due to the occurrence of the dynamic deformation is 326 nm. In addition, the RMS value of the dynamic deformation in the entire area of the reflective surface 210 of the scanning micromirror 200 according to the second embodiment is 82 nm.

Comparing the above results, when the scanning micromirror 200 according to the second embodiment is used, compared to the scanning micromirror C according to the comparative embodiment having no element capable of suppressing the dynamic deformation, it may be seen that the maximum height difference is reduced by 10.1%, and the RMS value is decreased by 11.8%.

Based on these simulation results, it may be seen that when the scanning micromirror 200 according to the second embodiment is used, the dynamic deformation is improved compared to the case where the scanning micromirror C according to the comparative embodiment is used.

Also, as the scanning micromirror 100 according to the first embodiment includes most of the features of the scanning micromirror 200 according to the second embodiment and is substantially identical to the scanning micromirror 200, it may be inferred that the dynamic deformation may also be improved when the scanning micromirror 100 is used according to the first embodiment compared to the case in which the scanning micromirror is used according the comparative embodiment.

The scanning micromirrors 100 and 200, according to the embodiments in which such dynamic deformation is improved, may use reflective surfaces having various sizes. Therefore, such scanning micromirrors may be used in various technical fields; for example, a hologram storage device using a laser as a light source, a projection-type display, an eye tracking device, a target tracking device, a laser shape measuring device and the like. In particular, the scanning micromirrors may be applicable to the LIDAR which requires a large reflective surface since they may use a large-diameter reflective surface with the reduced dynamic deformation.

While this disclosure includes specific embodiments, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A scanning micromirror comprising:
a reflective surface rotatable with respect to a rotation axis;
a rim disposed on the outside of the reflective surface;
a spring positioned on the rotation axis and connected to the reflective surface; and
a connector connecting the reflective surface and the rim,
wherein the rim comprises a first sub-rim disposed on one side and a second sub-rim disposed on the other side with respect to the spring,
wherein the connector comprises:
a radial direction connection element which extends in a radial direction of the reflective surface and a circumferential direction connection element which extends in circumferential direction of the reflective surface,
wherein one end of the radial direction connection element is connected to the reflective surface and the other end of the radial direction connection element is connected to the circumferential direction connection element, and
wherein the circumferential direction connection element is connected to the rim.

2. The scanning micromirror of claim 1, wherein the first sub-rim comprises:
a first sub-rim body member surrounding a circumference of the reflective surface; and
a first-sub-rim extension member which is spaced apart in parallel from the spring and which extends, and
the second sub-rim comprises:
a second sub-rim body member surrounding the circumference of the reflective surface; and
a second sub-rim extension member which is spaced apart in parallel from the spring and which extends.

3. The scanning micromirror of claim 1, wherein the rim comprises a recess in which the circumferential direction connection element is received.

4. A scanning micromirror comprising:
a reflective surface rotatable with respect to a rotational axis;
a rim disposed on the outside of the reflective surface;
a spring positioned on the rotational axis and connected to the reflective surface; and a connector comprising one or more connection members connecting the reflective surface and the rim, wherein the connection members comprise:

a radial direction connection element which extends in a radial direction of the reflective surface; and a circumferential direction connection element which extends in a circumferential direction of the reflective surface, wherein one end of the radial direction connection element connects to the reflective surface and the other end of the radial direction connection element connects to the circumferential direction connection element, and wherein the circumferential direction element connects to the rim.

5. The scanning micromirror of claim 4, wherein the connector comprises at least two connection members each on both sides of the rotation axis.

6. The scanning micromirror of claim 5, wherein the connection members are symmetrical with respect to the rotation axis.

7. The scanning micromirror of claim 6, wherein
the connection members are symmetrical with respect to a vertical axis, and
the vertical axis is perpendicular to the rotation axis and passes through a center of the reflective surface.

8. The scanning micromirror of claim 5, wherein circumferential direction connection elements of neighboring connection members are connected to each other.

9. The scanning micromirror of claim 4, wherein the rim comprises a recess in which the circumferential direction connection element is received,
wherein the recess communicates with one side of the rotation axis and communicates with the other side of the rotation axis.

10. The scanning micromirror of claim 9, wherein the rim comprises a first sub-rim and a second sub-rim disposed on one side and the other side with the respect to the spring,
wherein the first sub-rim comprises:
a first sub-rim body member surrounding the circumference of the reflective surface; and
a first sub-rim extension member which is spaced apart in parallel from the spring and which extends, and
wherein the second sub-rim comprises:
a second sub-rim body member surrounding the circumference of the reflective surface; and
a second sub-rim extension member which is spaced apart in parallel from the spring and which extends to the spring.

11. The scanning micromirror of claim 1, further comprising: a reinforcing material on a lower part of the reflective surface.

12. The scanning micromirror of claim 4, further comprising: a reinforcing material on a lower part of the reflective surface.

* * * * *